(12) United States Patent
Dussud (10) Patent No.: US 7,716,258 B2
(45) Date of Patent: May 11, 2010

(54) METHOD AND SYSTEM FOR MULTIPROCESSOR GARBAGE COLLECTION

(75) Inventor: Patrick H. Dussud, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 10/944,395

(22) Filed: Sep. 16, 2004

(65) Prior Publication Data

US 2005/0033781 A1  Feb. 10, 2005

(51) Int. Cl.
*G06F 17/30* (2006.01)

(52) U.S. Cl. .................. 707/813; 711/170; 345/504

(58) Field of Classification Search .................. None
See application file for complete search history.

(56) References Cited

U.S. PATENT DOCUMENTS

| | | | | |
|---|---|---|---|---|
| 4,961,137 | A | | 10/1990 | Augusteijn et al. ........... 707/206 |
| 5,088,036 | A | * | 2/1992 | Ellis et al. .................... 707/206 |
| 5,241,673 | A | | 8/1993 | Schelvis ...................... 707/206 |
| 5,440,746 | A | * | 8/1995 | Lentz .......................... 345/504 |
| 5,603,023 | A | * | 2/1997 | Machida ........................ 707/7 |
| 5,652,883 | A | | 7/1997 | Adcock ....................... 707/206 |
| 5,787,447 | A | * | 7/1998 | Smithline et al. ............. 707/206 |
| 5,842,016 | A | | 11/1998 | Toutonghi et al. ............ 395/676 |
| 5,845,298 | A | | 12/1998 | O'Connor et al. ............ 707/206 |
| 5,857,210 | A | | 1/1999 | Tremblay et al. ............. 707/206 |
| 5,946,487 | A | | 8/1999 | Dangelo ..................... 717/148 |
| 6,065,020 | A | | 5/2000 | Dussud ....................... 707/206 |
| 6,108,754 | A | | 8/2000 | Lindholm .................... 711/122 |
| 6,199,075 | B1 | | 3/2001 | Ungar et al. ................ 707/206 |
| 6,230,313 | B1 | | 5/2001 | Callahan et al. ............. 717/128 |
| 6,253,215 | B1 | | 6/2001 | Agesen et al. ............... 707/206 |
| 6,289,360 | B1 | * | 9/2001 | Kolodner et al. ............. 707/206 |
| 6,308,319 | B1 | | 10/2001 | Bush et al. ................... 707/206 |
| 6,317,816 | B1 | | 11/2001 | Loen ....................... 707/103 R |
| 6,397,379 | B1 | | 5/2002 | Yates et al. .................. 717/140 |
| 6,430,580 | B1 | | 8/2002 | Azagury et al. ............. 707/206 |
| 6,480,862 | B1 | | 11/2002 | Gall ............................ 707/206 |
| 6,502,111 | B1 | | 12/2002 | Dussud ........................ 707/206 |

OTHER PUBLICATIONS

Lock-free garbage collection for multiprocessor, Herly, M.P.; Moss, J.E.B., Parrallel and Distributed Systems, IEEE Transactions on vol. 3, Issue 3, May 1992 pp. 304-311.*

(Continued)

*Primary Examiner*—Tim T. Vo
*Assistant Examiner*—Hasanul Mobin
(74) *Attorney, Agent, or Firm*—Merchant & Gould PC (57) ABSTRACT

A garbage collection system and method in a multiprocessor environment having a shared memory wherein two or more processing units participate in the reclamation of garbage memory objects. The shared memory is divided into regions or heaps and all heaps are dedicated to one of the participating processing units. The processing units generally perform garbage collection operations, i.e., a thread on the heap or heaps that are dedicated to that processing unit. However, the processing units are also allowed to access and modify other memory objects, in other heaps when those objects are referenced by and therefore may be traced back to memory objects within the processing units dedicated heap. The processors are synchronized at rendezvous points to prevent reclamation of used memory objects.

16 Claims, 5 Drawing Sheets

OTHER PUBLICATIONS

Fast Multiprocessor Memory Allocation and Garbage collection, Hans-J. Boehm, Hewlett-Packard ILboratories, Palo Alto, CA 94304.*

Toshio Endo, Kenjiro Taura, Akinori Yonezawa, "A scalable mark-sweep garbage collector on large-scale shared-memory machines", Nov. 1997, Proceedings of the 1997 ACM/IEEE conference on Supercomputing (CDROM) Supercomputing '97.*

"Lock-Free Garbage Collection for Multiprocessor", Maurice P. Herlihy et al., Parallel and Distributed Systems, IEEE Transactions on vol. 3, Issue 3, May 1992, pp. 304-311.*

Richard Jones and Rafael Lins, *Garbage Collection: Algorithms for Automatic Dynamic Memory Management*, 1996, pp. 184-226.

Anthony James Courtemanche, *MultiTrash, a Parallel Garbage Collector for MultiScheme*, Jan. 27, 1986, pp. 1-47/.

'Garbage Collection in MultiScheme (Preliminary Version)', J.S. Miller and B. Epstein in "Parallel Lisp: Languages and Systems", Springer-Verlag Lectur Notes in Computer Science, T. Ito and R.H. Halstead, Jr., editors, 1990.

"A shared-Memory Multiprocessor Garbage Collector and its Evaluation for Committed-Choice Logic Programs"—A. lmai & E. Tick; 1991—IEEE (pp. 870-877).

"Garbage Collecting the Internet: A Survey of Distributed Garbage Collection"—Saleh E. Abdullahi & Graem A. Ringwood—AC Computing Surveys, vol. 30, No. 3, Sep. 1998; (pp. 330-338=73).

"Portable, Unobtrusive Garbage Collection for Multiprocessor Systems"—Damien Doligez and Georges Gonthier—1994 ACM (pp. 70-83).

"Evaluation of parallel Copying Garbage Collection on a Shared-Memory Multiprocessor"—Akira Imai and Evan Tick,—1003—IEEE (pp. 1030-1040).

"A Space-Efficient Parallel Garbage Compaction Algorithm"—Wolfgang Kuchlin—1991—ACM (pp. 40-46).

"A Scaleable mark-Sweep Garbage Collector on Large-Scale Shared-Memory Machines"—Toshio Endo, Kenjiro Taura and Akinori Yonezawa—1997—ACM (pp. 1-14).

* cited by examiner

METHOD AND SYSTEM FOR MULTIPROCESSOR GARBAGE COLLECTION

TECHNICAL FIELD

The present invention relates to methods and systems for the automatic reclamation of allocated memory, normally referred to as "garbage collection." More particularly, the present invention relates to garbage collection for multiprocessor environments.

BACKGROUND OF THE INVENTION

Many computer systems, such as server systems, use a plurality of processing units or microprocessors to increase the overall processing power of the computer system. In a multiprocessor system, the separate processing units may often share the operating memory of the system.

In typical shared memory systems, a memory manager allocates memory to a requesting program and performs the process of garbage collection for that program. However, when garbage collection operations were performed on a memory in the multiple processor environment, the garbage collection was performed by one processor. All other processors were paused until the garbage collection operation was complete. This was done to prevent access by one processor to the shared memory while another processor was cleaning up the memory. As a result the efficiency of the multiple processor systems is significantly reduced due to the idle time of the unused processors during garbage collection.

It is with respect to these considerations and others that the present invention has been made.

SUMMARY OF THE INVENTION

The present invention relates to garbage collection in a multiprocessor environment having a shared memory wherein two or more processing units participate in the reclamation of garbage memory objects. The shared memory is divided into regions or heaps and all heaps are dedicated to one of the participating processing units. The processing units generally perform garbage collection operations, i.e., a thread on the heap or heaps that are dedicated to that processing unit. However, the processing units are also allowed to access and modify other memory objects, in other heaps when those objects are referenced by and therefore may be traced back to memory objects within the processing units dedicated heap.

Since processing units may access and modify objects in other heaps, the processing units must be synchronized. Synchronization occurs following predetermined phases of the garbage collection process, at "rendezvous points." In an embodiment of the invention, each garbage collection thread operates in four phases—marking, planning, relocation and compaction. The rendezvous points are at the ends of each phase. Each garbage collection thread will wait for all the other garbage collection threads to complete the present phase before beginning the next phase.

In an embodiment of the invention, since objects may reference across heaps, a reference is written to a directory when an object, referenced by an object in another heap, is relocated in a heap. Thus, during the relocation phase, not only is the new location of an object in its heap written, but also a pointer to the new location of the object is written for those objects referenced by objects in other heaps.

The present invention relates to a system and method of collecting garbage in a computer system having a memory and a plurality of multiprocessors that share the memory. In general, the memory is logically viewed by the application program as one heap but it is divided into a plurality of heaps, each heap dedicated to one processor for garbage collection. Using the plurality of heaps, a plurality of garbage collection phases are performed, wherein each processor having a dedicated heap performs each of the phases using a garbage collection thread executing on the processor. Moreover, the processors are synchronized so that each processor has completed the preceding phase prior to beginning the next phase. The synchronizing act may wait for the other processors to complete the phase of the garbage collection process and once the other processors have completed the phase of the garbage collection process, beginning the next phase of the garbage collection process.

In accordance with other aspects, the present invention relates to a method of garbage collection that occurs in phases, such as a marking phase that marks all reachable objects in memory, a planning phase that plans the relocation of the object, a relocation phase that updates the object references based on information calculated by the planning phase, and a compaction phase that compacts the reachable objects in memory. The marking phase marks objects independently of the heap boundaries. The planning phase may further maintain a directory of object references for use during the relocation phase. The relocation phase analyzes each memory object to retrieve references to other memory objects. If a reference to another memory object is present, that reference information is analyzed to determine which heap the referenced object is associated. Next, the directory for that heap is analyzed to determine a new address location of the referenced object so that the reference information in the memory object may be updated.

In accordance with yet other aspects, the method stops executing process threads prior to performing the marking phase. In order to execute the threads for the different phases, parallel threads are initiated in each processing unit that is associated with a memory heap. Upon completion of all garbage collection threads for a phase, parallel threads are then restarted for the next phase.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION OF THE INVENTION

Figure 1:
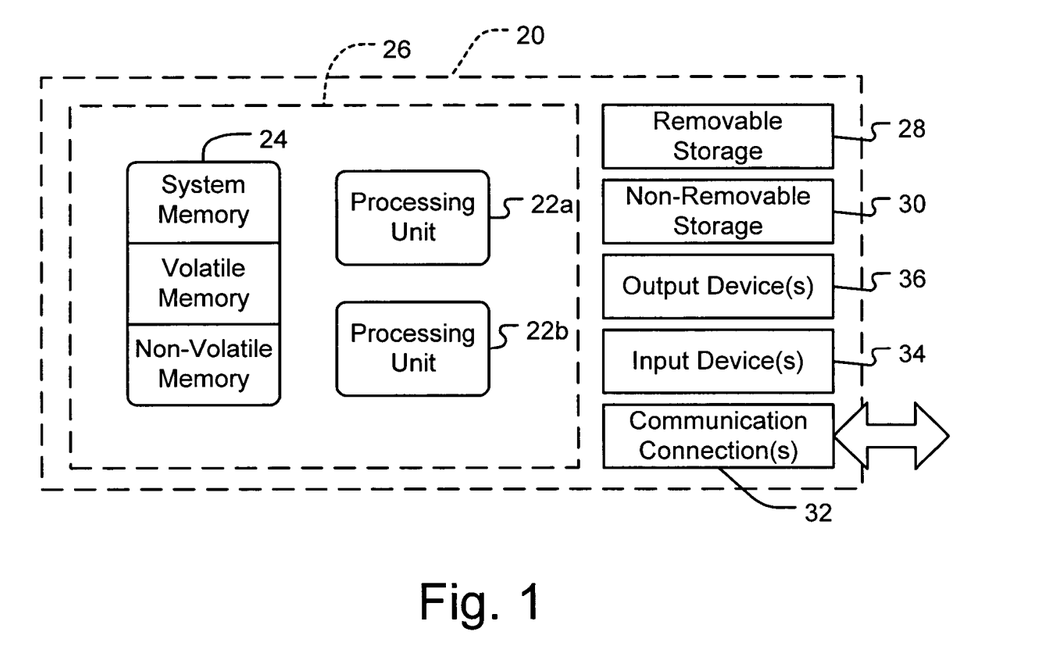
FIG. 1 illustrates a computer system incorporating a garbage collector of the present invention.

A computer system 20 that performs a process of reclaiming unused memory portions, pages or objects (collectively referred to herein as "objects") that are allocated to application programs or other processes, i.e., garbage collection, according to the present invention is shown in FIG. 1. The system 20 has multiple processors 22 and a shared memory 24. In an embodiment of the invention, the system has two processors 22a and 22b as shown in FIG. 1, but in other embodiments, the system may have more than two processors. The processors 22 share the same memory 24 and each of the processors 22 performs garbage collection over predetermined portions of the memory 24 in accordance with the present invention, as described below. In alternative embodiments having more than two processing units, all processing units may perform garbage collection but not all processing units are required to participate in garbage collection. Indeed, while more than one processing unit participates in garbage collection, any number of units could be used for this process.

In its most basic configuration, computing system 20 is illustrated in FIG. 1 by dashed line 26. Additionally, system 20 may also include additional storage (removable and/or non-removable) including, but not limited to, magnetic or optical disks or tape. Such additional storage is illustrated in FIG. 1 by removable storage 28 and non-removable storage 30. Computer storage media includes volatile and nonvolatile, removable and non-removable media implemented in any method or technology for storage of information such as computer readable instructions, data structures, program modules or other data. Memory 24, removable storage 28 and non-removable storage 30 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 20. Any such computer storage media may be part of system 20. Depending on the configuration and type of computing device, memory 24 may be volatile, non-volatile or some combination of the two.

System 20 may also contain communications connection(s) 32 that allow the device to communicate with other devices. Communications connection(s) 32 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 20 may also have input device(s) 34 such as keyboard, mouse, pen, voice input device, touch input device, etc. Output device(s) 36 such as a display, speakers, printer, etc. may also be included. All these devices are well known in the art and need not be discussed at length here.

Computer system 20 typically includes at least some form of computer readable media. Computer readable media can be any available media that can be accessed by system 20. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 2:
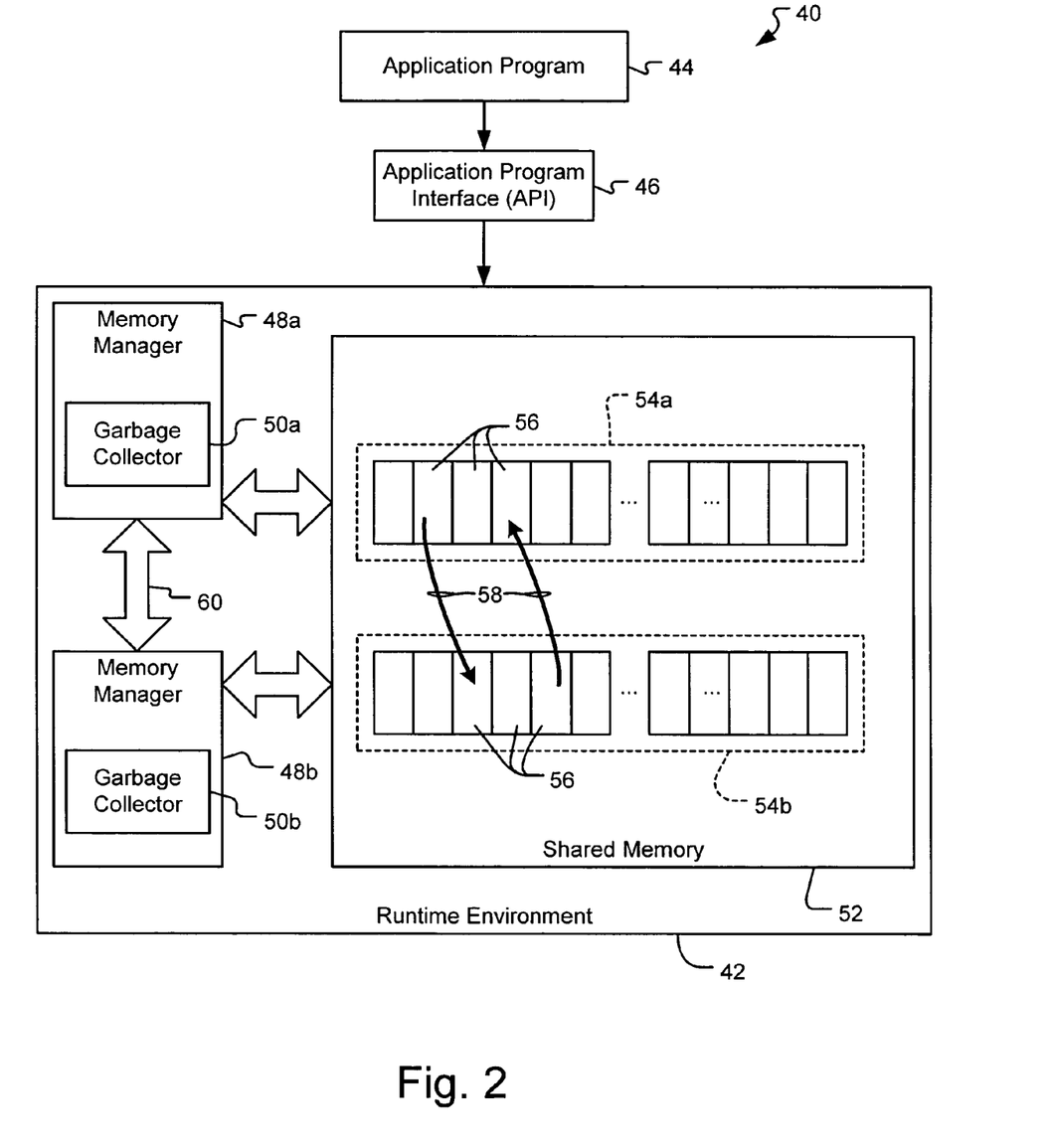
FIG. 2 illustrates functional software components of the present invention, including the garbage collector incorporated in the system shown in FIG. 1.

FIG. 2 illustrates a suitable software environment 40 of functional software components in which the present invention may be implemented. The software environment 40 is only one example of a suitable environment and is not intended to suggest any limitation as to the scope of use or functionality of the invention. Other well-known environments, and/or configurations that may be suitable for use with the invention may implement the present invention.

The software environment 40 incorporates a runtime environment 42 that incorporates aspects of the present invention. The environment 40 has a runtime environment 42 that operates to execute application programs and processes, such as application program 44. The application program 44 may communicate directly with the runtime environment or communicate through an application program interface, such as application program interface 46 shown in FIG. 2.

The runtime environment 42 incorporates at least two memory managers 48, such as memory managers 48a and 48b, each having a garbage collector module 50, such as garbage collector modules 50a and 50b. In alternative embodiments, the garbage collectors 50 may not be in memory managers, and may even be separate applications apart from the runtime environment. Although the garbage collectors may be separate from the memory managers, a plurality of separate garbage collector processes are collectively used to perform garbage collection in environment 40. In an embodiment of the invention, each memory manager 48a and 48b is associated with one processing unit, such as 22a and 22b (FIG. 1), respectively. In other embodiments, other combinations of memory managers and processing units may be used. Moreover, in an embodiment, the process of garbage collection is provided as a service by the runtime environment. In other embodiments, the garbage collection may be a separate processing thread separate from the runtime environment.

The runtime environment 42 also incorporates a shared memory 52. The shared memory, which is the portion of memory that maintains allocated memory for the application program 44 and other running applications or processes (not shown). The memory portion 52 is divided into heaps 54. A heap may be a contiguous array of memory objects 56 or it may be organized into a set of discontinuous memory objects 56. The heap portions may be based on physical address space wherein the entire memory equally divided and each processor is assigned a portion or the heaps may be configured dynamically based on processor needs and/or other factors. Either way, by the time the process begins garbage collection, the portions of memory that each processor is responsible is known or readily determinable by the processor and is therefore, predetermined.

The memory objects 56 contain data and other information for use by the application 44. Additionally, the memory objects may contain object reference information relating to other memory objects 56. Moreover, the memory object reference information may relate to objects 56 within the same heap or within another heap 54. Arrows 58 indicate such cross-heap references. Object references therefore have information related to both the heap for the referenced object and the address location within the heap.

In an embodiment of the invention, the memory is divided into as many heaps as there are processing units 22 (FIG. 1). Therefore, each processing unit 22 can manage and maintain a predetermined portion or heap of the memory. In this embodiment, memory managers 48a and 48b are associated with different processing units and therefore each memory manager maintains a different heap 54 from the other memory manager. Thus, each processing unit, such as 22a and 22b, is associated with a particular heap, such as 54a and 54b, respectively, such that the heap 54a is dedicated to the processing unit 22a and heap 54b is dedicated to processing unit 22b through memory managers 48a and 48b. The memory managers 48a and 48b communicate with each other as indicated by arrow 60 in order to synchronize various operations such as memory allocation and garbage collection.

As stated above, the present invention is embodied in garbage collection operations in a multiprocessor environment, such as environment 20 shown in FIG. 1, wherein the memory is divided into heaps 54 as shown in FIG. 2. An embodiment of the invention involves using all processing units 22 to collect garbage objects. In order to do so, the units 22 use garbage collector modules 50 to collect garbage objects within an assigned heap 54 of memory. Moreover, to accommodate cross-heap referenced memory objects, each garbage collector marks 50 objects independently of which heap 54 the object may reside. The activities of the different garbage collectors are synchronized following the mark phase. The synchronization or rendezvous allows all garbage collectors 50 to complete marking all reachable objects before any one collector 50 proceeds to the next phase so that unmarked objects are not inadvertently reclaimed. Similar rendezvous or synchronization events occur at the end of each phase of the garbage collection process, as described below.

The present invention may be described in the general context of computer-executable instructions, such as program modules, executed by one or more computers or other devices. Generally, program modules include routines, programs, object-oriented-type objects, components, data structures, etc. that perform particular tasks or implement particular abstract data types. Typically the functionality of the program modules may be combined or distributed as desired in various embodiments. Additionally, the logical operations of the various embodiments of the present invention may also be partially or wholly implemented as interconnected hardware or logic modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 3:
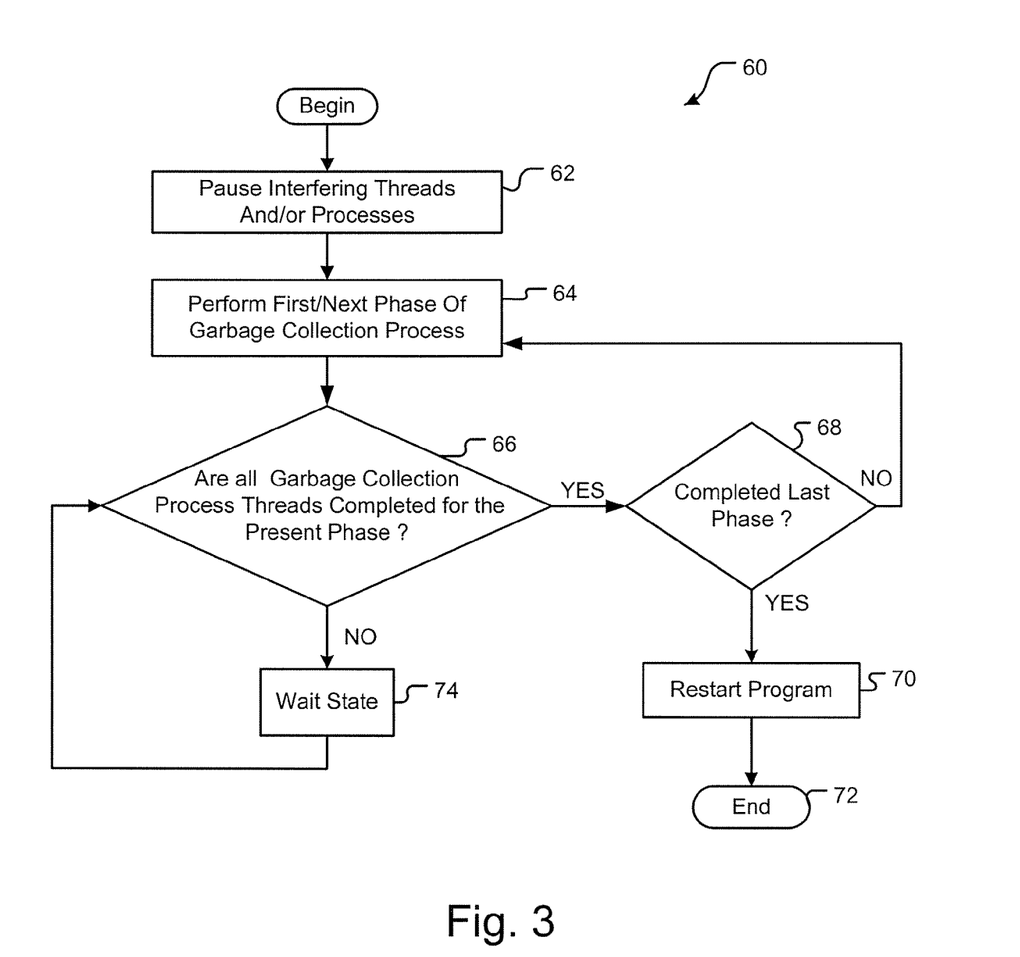
FIG. 3 is a flow diagram showing the operational characteristics performed by the garbage collector shown in FIG. 1 in accordance with the present invention.

With respect to the garbage collector modules 50, shown in FIG. 2, the modules perform a number of operations or phases in order to reclaim the memory. In an embodiment of the invention, typical phases may be marking and sweeping or copying the memory objects. Alternative embodiments may have other phases. The flow 60 of logical operations performed by the garbage collectors 50 during a collection session is shown in FIG. 3. In an embodiment, one of the memory managers 48 initiates the flow 60 once a predetermined amount of memory has been allocated. In other embodiments, one of the other modules initiates the garbage collection flow 60, such as the garbage collector 50 or the runtime environment 42. Other modules or processes could be used to monitor memory use and initiate garbage collection when necessary.

The flow 60 begins with pause operation 62, which pauses any interfering processes and/or threads. Interfering processes or threads are any executing processes, such as applications, that use the shared memory. Additionally, other processes that may interfere with processing time may also be paused. Stopping or pausing interfering processes or threads is known to those skilled in the art since the processes must be stopped to perform garbage collection whether using one or multiple processors to carry out the garbage collection.

Once the interfering processes or threads are paused, the perform first/next phase operation 64 performs the first phase of the garbage collection process. In an embodiment, the first phase involves examining the roots of a dedicated heap of memory objects. Each processing unit operates on one heap of information. However, if necessary, the processing units can reach and modify objects located on other, non-dedicated heaps. Therefore, operation 64 relates to multiple garbage collection processing threads operating in parallel on different heaps of information.

As each garbage collection processing thread completes the first phase of the garbage collection process, test operation 66 tests whether the remaining garbage collection process threads have completed the first phase of the garbage collection process. If not flow branches NO to a wait state operation 74, which forces the process to wait a cycle or two and then branches back to test operation 66.

Once all garbage collection process threads have completed the first phase of the garbage collection process, test operation 66 causes flow to branch YES to test operation 68. Test operation 68 determines whether all the garbage collection phases are completed. If so, then the garbage objects have been collected and flow branches YES to restart operation 70. Restart operation 70 restarts any processes that were paused at operation 62. Once the processes are restarted, flow 60 ends at 72.

If test operation 68 determines that there are more garbage collection phases to be done, then flow branches NO back to perform first/next phase operation 64. Operation 64 performs the next garbage collection phase necessary to complete the garbage collection process. In an embodiment, the next phase relates to sweeping the memory for garbage objects. In other embodiments, such as one discussed below, there are several phases that need to be completed before the garbage collection process is completed. Once operation 64 performs the next phase of the process flow continues as before through test operations 66 and 68 until all operations are complete.

Before the next phase is started, however, test operation 66 ensures that all garbage-collection processing threads have completed the preceding phase. The purpose behind waiting for all threads to be complete is to prevent one thread from performing the next phase of the garbage collection process on its own heap before another thread makes necessary modifications to any garbage-collection related memory in the heap. Since some garbage-collection memory in its heap may eventually be used by another thread, each thread must wait for the other threads to complete the preceding phase before starting the next phase.

Figure 4:
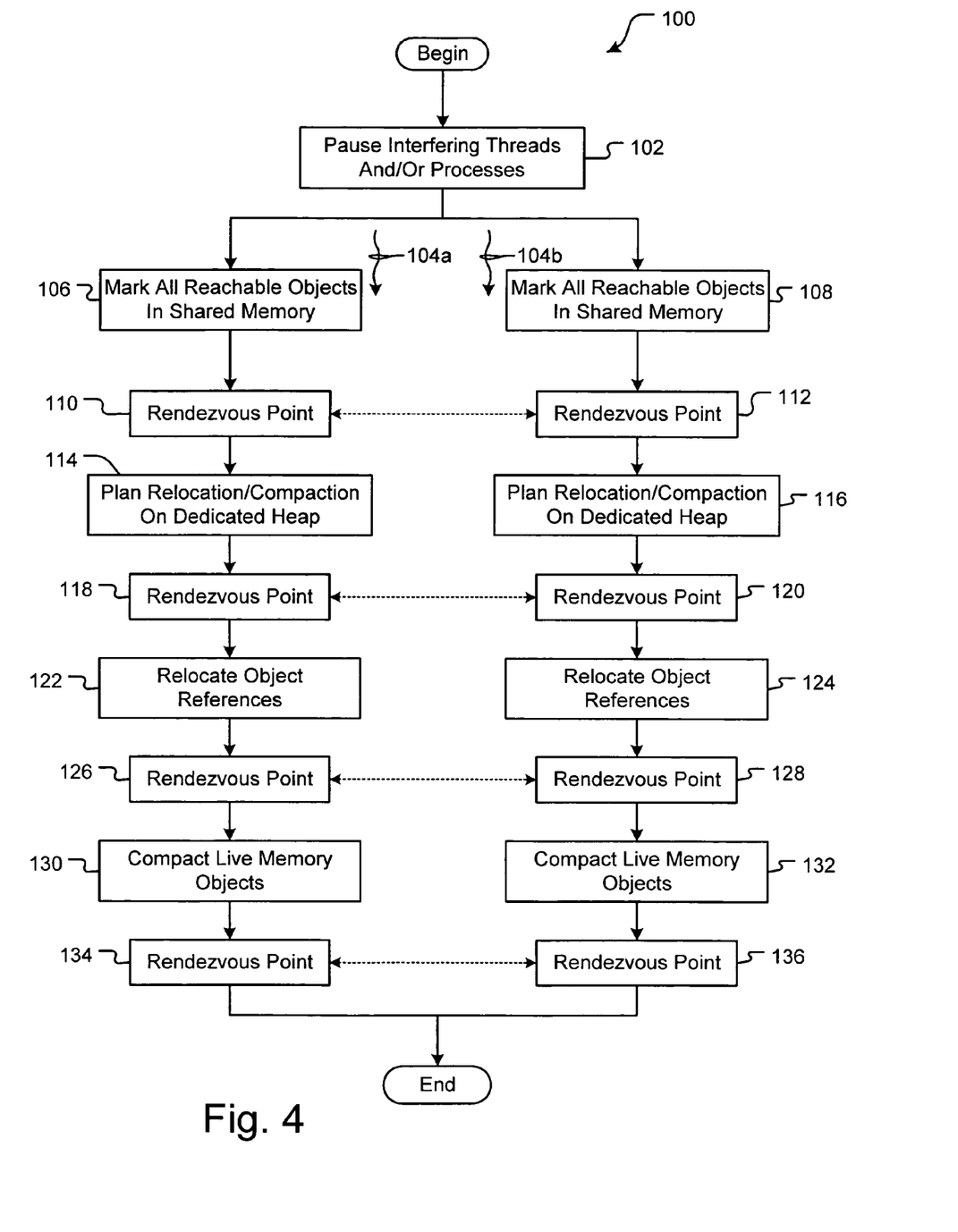
FIG. 4 is a flow diagram showing the operational characteristics performed by an alternative embodiment of the garbage collector shown in FIG. 1 in accordance with the present invention.

Another embodiment of the present invention is shown in FIG. 4. Flow 100 begins with pause operation 102, which pauses any executing application program, such as application program 44 (FIG. 2) or any other running process that uses memory and must be stopped during the marking phase. In essence, any program threads interfering with the heaps 54 are stopped or paused. Pause operation 102 is similar to pause operation 62 described above.

Once the interfering processes or threads are paused, one garbage collection thread process for each processing unit 22 is initiated. That is, following the pause operation 102, threads 104*a* and 104*b* are started wherein each thread is associated with one processing unit 22 (FIG. 1) and one heap 54 (FIG. 2). For the purposes of the following description, memory manager 48*a* and garbage collector 50*a* is associated with processing unit 22*a* to perform thread 104*a* on dedicated heap 54*a*. Similarly, heap 54*b* is dedicated to memory manager 48*b* and collector 50*b*, which are associated with processing unit 22*b* that performs thread 104*b*. In embodiments having more than two processing units, a thread 104 for each of the additional processing units is implemented.

With respect to thread 104*a*, the logical operations begin with mark operation 106. Mark operation 106 locates and marks the roots of the processing threads associated with the heap 54 dedicated to garbage collection thread 104*a*. During the mark operation, each memory object that is referenced by a root is analyzed to determine if the memory object references another memory object. If so, the next referenced memory object is then analyzed. Additionally, if the memory object that is referenced, either by a root or by another memory object is in a non-dedicated heap 54*b*, i.e., a heap that is not the dedicated heap, such as 54*a*, then the mark operation still traverses and marks the memory object. Thus, the mark operation 106 traces memory objects relatively independently of the heap boundaries. The only exception is that the operation does not begin traces using root information from other heaps.

With respect to the algorithms used to trace the reachable objects, many different algorithms may be implemented in accordance with principles of the present invention. In an embodiment, mark operation 106 recursively traverses the memory objects, beginning at the first root reference and traverse each pointer representation, and marks each item that is visited until all object references beginning from the root reference are exhausted. Once exhausted, the process proceeds to the next root reference, again traversing each pointer reference and marking each visited object as visited. The same process continues until all root references, and their associated, reachable memory objects are marked as reachable, i.e., live.

In alternative embodiments, recursion is replaced by other methods of tracing objects referenced by either the roots or other objects, such as through the use of iterative loops and auxiliary data structures. In such as case, an auxiliary stack can be used to store pointer information to live objects that have not been visited. As items are popped from the stack, each item is analyzed to determine whether it has referenced other objects, and then it is removed from the stack and marked as visited. If a popped item references another object, information related to the referenced to object is placed on the stack as live and unvisited and that object is deemed live and unvisited. The operations continue until the stack is empty.

With respect to marking, there are many acceptable methods of marking memory objects. That is, for the purposes of the present invention, practically any marking scheme that effectively identifies the live objects as live may be used. For example, a single bit can be changed to indicate marked or unmarked. In an alternative embodiment, references to the live objects could be stored in a data structure and later used during the clean up or sweep portion of the garbage collection.

While marking operation 106 is being performed by thread 104*a*, thread 104*b* performs mark operation 108. Since thread 104*b* is performed by processing unit 22*b* (FIG. 1), this thread may operation substantially concurrently with thread 104*a* described above. Functionally, mark operation 108 is the same as mark operation 106 described above. The only difference is that mark operation 108 begins marking objects using root information from a different dedicated heap, such as heap 54*b* instead of heap 54*a*, which is dedicated to thread 104*a*. Therefore, mark operation 108 marks all reachable objects originating from roots within heap 54*b* independently of the actual heap location for the objects.

Since marking operation 106 and 108 only set or mark objects as visited, i.e., the operations 106 and 108 do not clear objects or otherwise mark objects as not visited, conflicts related to both operations 106 and 108 attempting to mark the same object are of little concern. More specifically, if one operation, such as 106, reaches and marks the object before the other operation, such as 108, then operation 108 simply notices that the object is marked and does nothing further regarding the marked object. Similarly, if operation 108 marked the object and then operation 106 reached the object, operation 106 would notice that the object is marked and do nothing further regarding the marked object. If, however, both operations 106 and 108 reach the object at the same time, then both operations would mark the object and analyze its object references and proceed to the next object. The object marked as visited by two operations is not treated differently than if marked by only one operation. As both operations trace the same sub-objects, i.e., objects referenced by the marked object, one processor will most likely be faster than the other so that eventually one operation will reach and mark the next object before the other arrives. Once this occurs the later operation stops tracing sub-objects and any inefficiencies of dual tracing are reduced.

Referring back to thread 104*a*, once the reachable objects in shared memory are marked by operation 106, rendezvous point or operation 110 temporarily pauses the garbage collection operations. Similarly, rendezvous point 112 temporarily pauses thread 104*b* following the mark operation 108. Rendezvous points 110 and 112 are collections of operations that effectively pause or disable the garbage collection process threads 104*a* and 104*b*, respectively, until any other garbage collection process thread or threads have finished marking memory objects in the shared memory that are reachable from the root information located in the dedicated heaps for those threads. The rendezvous points 110 and 112 may deliver and receive information to and from the other rendezvous points, such as 112 and 110, respectively, to communicate necessary information related to whether each thread has completed the marking process.

Once it is determined, at point 110, that all other threads have completed their respective mark operations, such as mark operation 108 for thread 104b, plan operation 114 plans the relocation and compaction scheme for the dedicated heap 54a. Plan operation, analyzes the locations of the marked objects in the heap 54a, whether marked by mark operation 108 or 110, and plans the new physical locations for the memory objects. For instance, plan operation 114 may determine the sizes of any gaps between marked objects, and elects to position a plug having the same size within that gap. Otherwise, the plan operation 114 may simply determine the new memory addresses for the memory objects as the objects are logically slid toward one direction, eliminating any existing gaps.

Plan operation 114 may create an additional data structure or directory related to object references that reference memory objects located in other heaps. Other threads may then use this information during other phases of garbage collection for their respective heaps.

With respect to thread 104b, once rendezvous operation 112 determines that all the other threads, such as 104a, have completed their respective marking operations, then plan operation 116 begins. Plan operation 116 operates on heap 54b to perform the same planning function as plan operation 114 performed on heap 54a. Plan operation 116 may follow the same algorithms for calculating new memory addresses as operation 114 discussed above. Alternatively, the planning phase may use different planning procedures to relocate the memory objects 116. Even if plan operation 116 uses different algorithms than plan operation 114, plan operation 116 still determines the new memory addresses for the memory objects that are to be moved.

Following the planning operations 114 and 116, rendezvous points 118 and 120 temporarily pause threads 104a and 104b, respectively, until all other planning phases are completed. Rendezvous points 118 and 120 are similar to points 110 and 112 in that rendezvous points 118 and 120 may deliver and receive information to and from the other rendezvous points, such as 120 and 118, respectively, to communicate necessary information related to whether each thread has completed the preceding process.

Referring to thread 104a, once rendezvous point 118 determines that all other threads have completed their respective plan operations, relocate operation 122 relocates the object references within each memory object in the dedicated heap that references other objects. In other words, memory objects that reference other memory objects need to be updated with the new location information for those memory objects that will be moved. Relocation operation uses the new address information calculated by plan operation 114 to modify these memory objects, effectively updating all object reference information. Following relocate operation 122, all memory objects having references to other memory objects have updated information related to the new locations of the memory objects.

In the same ways that relocate operation 122 updates the information the memory objects for heap 54a, relocate operation 124 updates the memory reference information in the memory objects in heap 54b. Relocate operation 124, however, does not begin until rendezvous operation 120 indicates that all other plan operations are complete.

When a memory object in one heap, such as heap 54a, references an object in another heap, such as 54b, the object in heap 54a must be updated with information determined by the thread 104b, which operates on heap 54b. In order to do so, the garbage collection 104b maintains a directory, or other data structure indicating the previous address information and the new address information for the objects in heap 54b. In operation, relocate operation 122 analyzes the object in heap 54a and recognizes that the object references another object. Relocate operation 122 analyzes this information to determine which heap the referenced object is located, such as heap 54b. Once determined, relocate operation 122 analyzes the directory for that heap and using the old address value looks up the new address value. Using the new address value, the object reference is updated.

Since relocate operations 122 and 124 use information calculated by earlier plan operations 114 and 116 and since either relocate operations 122 and 124 could end up using information from other threads, neither relocate operation 122 or 124 starts before all other plan operations, such as plan operations 116 and 114 are completed. Rendezvous points 118 and 120 ensure that other plan operations are complete before the relocate operations begin. In an embodiment, the relocate operations begin at approximately the same time. In another embodiment, relocate operations 122 and 124 may start at different times from each other, but not before all plan operations, such as plan operations 114 and 116 are complete.

Following the relocation operations 122 and 124, rendezvous points 126 and 128 temporarily pause threads 104a and 104b, respectively, until all other relocation phases are completed. Rendezvous points 126 and 128 are similar to points 110, 112, 118 and 120 in that rendezvous points 126 and 128 may deliver and receive information to and from the other rendezvous points, such as 128 and 126, respectively, to communicate necessary information related to whether each thread has completed the preceding processes.

Once rendezvous operation 126 indicates that the relocation operation 122 is complete, compact operation 130 compacts the memory objects. Compact operation 130 physically moves information in the marked memory objects from one place to another, compacting the memory objects so that no gaps exist between the memory objects. Such a sliding phase defragments the memory in the heap. The positioning of the objects is determined by the plan operation 114 and compact operation 130 carries out the movement to those final positions. Additionally, a memory pointer at the end of the compacted memory objects can be used to indicate the physical location of the next free memory object for allocation. By moving all the live objects into a continuous set of memory address spaces, the remaining memory is deemed free and hence any garbage objects have been effectively collected.

A similar operation occurs in thread 104b. Following rendezvous operation 128, compact operation 132 compacts the live memory objects for heap 54b. Compact operation 132 is functionally similar to compact operation 130, since both move memory blocks according to compact the memory and fill any gaps between live memory objects. Compact operation 132 uses information calculated by plan operation 116 to move the objects. Once the live objects have been compacted, a pointer at the end of the live objects provides the memory manager with the location of the free memory objects.

Following the compaction operations 130 and 132, rendezvous points 134 and 136 temporarily pause threads 104a and 104b, respectively, until all other compaction phases are completed. Since the memory is shared by all processing units, each thread must wait for the others to complete before restarting any processes. Rendezvous points 134 and 136 are similar to points 110, 112, 118, 120, 126 and 128 discussed above in that rendezvous points 134 and 136 may deliver and receive information to and from the other rendezvous points, such as 136 and 134, respectively, to communicate necessary information related to whether each thread has completed the preceding processes.

Figure 5:
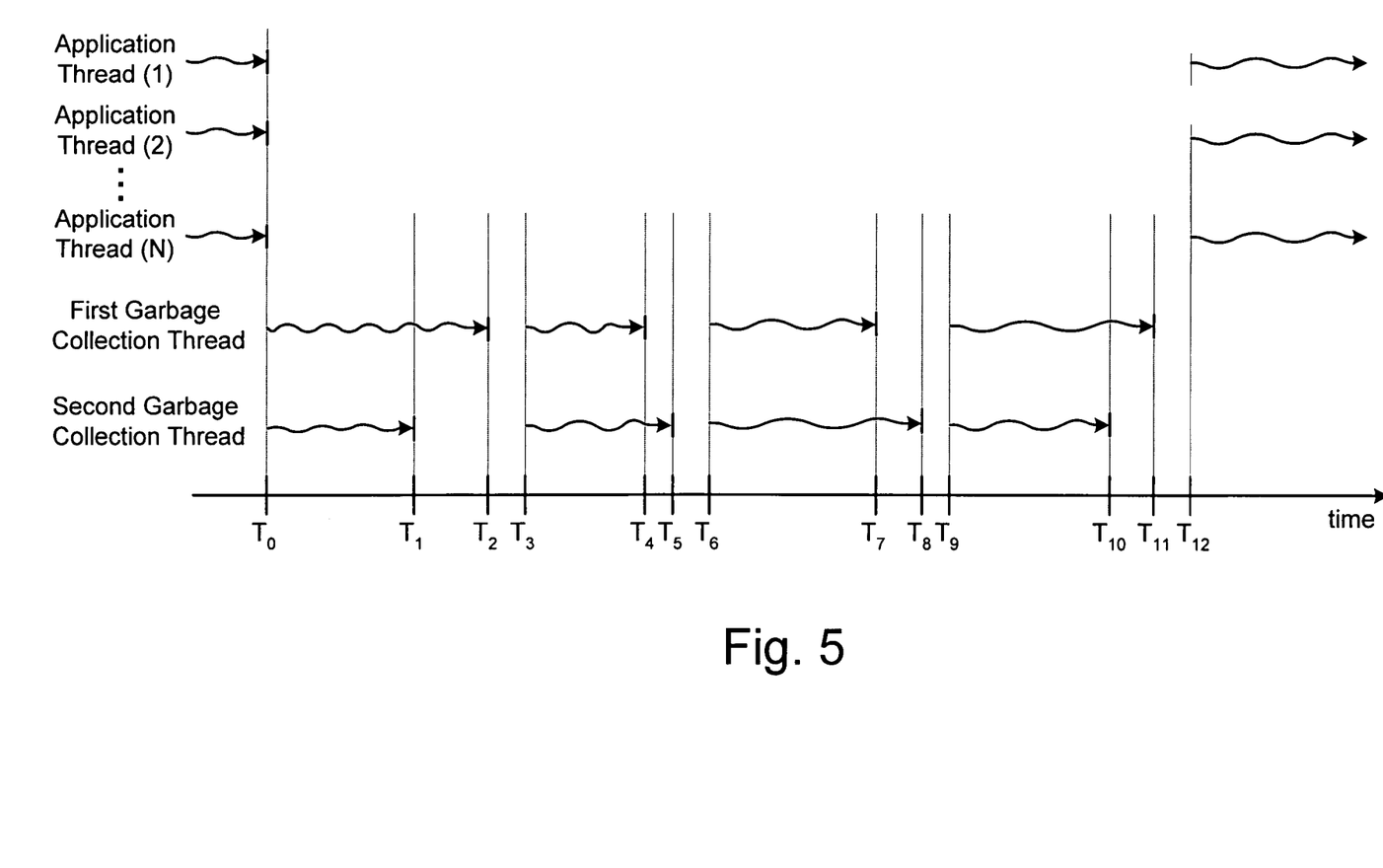
FIG. 5 a time analysis indicating the timing of the operational characteristics of an example of a garbage collection process performed by the garbage collector shown in FIG. 2.

In operation, each garbage collection phase for the different garbage collection threads may start at approximately the same time, following the completion of the previous phase by all the garbage collection threads. An exemplary timing diagram is shown in FIG. 5 and illustrates the relative timing different garbage collection threads, such as 104a and 104b, of a two processing unit system, such as system 20 (FIG. 1). The example shown in FIG. 5 is intended as an example to illustrate start and stop times of different garbage collection phases and threads with respect to other garbage collection threads and no representation is made as to the accuracy of the scale of times for completing processes, phases or pauses.

In the timing example shown in FIG. 5, at time $T_0$, application threads (1-N) are stopped and two garbage collection threads are started. At time $T_1$, the second garbage collection thread completes the first phase of the garbage collection process, e.g., the marking phase, on its dedicated heap and any other cross-heap referenced memory objects. However, at $T_1$, the first garbage collection thread has not completed the first phase. Therefore, the second garbage collection thread must wait until the first garbage collection thread completes the first phase before starting the second phase.

At time $T_2$, the first garbage collection thread completes the first phase of the garbage collection process. Therefore, at time $T_3$, both the first and second garbage collection threads may start the second phase. The time period between $T_2$ and $T_3$ represents the test operation 66 (FIG. 3) or the rendezvous point 110 and 112 (FIG. 4), wherein the two threads communicate in order to establish that the other threads have completed the preceding phase.

As shown in FIG. 5, at time $T_3$, the second phase of the garbage collection process is started for both the first and second garbage collection threads. At $T_4$, the first garbage collection thread completes the second phase of the garbage collection process, e.g., the planning phase, on its dedicated heap. However, at $T_4$, the second garbage collection thread has not completed the second phase. Therefore, the first garbage collection thread must wait until the second garbage collection thread completes the second phase before starting the third phase. At time $T_5$, the second garbage collection thread completes the second phase of the garbage collection process. Therefore, at time $T_6$, both the first and second garbage collection threads may start the third phase.

As before there is a small pause between the time when the last thread completes the present phase and when the next phase can begin, i.e., the time from $T_5$ and $T_6$. Again, this time period represents the overhead in ensuring that all the threads have completed before starting the next phase.

Next, at time $T_6$, the third phase of the garbage collection process is started for both the first and second garbage collection threads. At $T_7$, the first garbage collection thread completes the third phase of the garbage collection process, e.g., the relocation phase, on its dedicated heap. However, at $T_7$, the second garbage collection thread has not completed the third phase. Therefore, the first garbage collection thread must wait until the second garbage collection thread completes the third phase before starting the final phase. At time $T_8$, the second garbage collection thread completes the third phase of the garbage collection process. Therefore, at time $T_9$, both the first and second garbage collection threads may start the final phase.

As before, there is a small pause between the time when the last thread completes the present phase and when the next phase can begin, i.e., the time from $T_8$ and $T_9$. Again, this time period represents the overhead in ensuring that all the threads have completed before starting the next phase.

Last, at time $T_9$, the final phase of the garbage collection process is started for both the first and second garbage collection threads. At $T_{10}$, the second garbage collection thread completes the final phase of the garbage collection process, e.g., the compaction phase, on its dedicated heap. However, at $T_{10}$, the first garbage collection thread has not completed the final phase. Therefore, the second garbage collection thread must wait until the first garbage collection thread completes the final phase before ending the process. At time $T_{11}$, the first garbage collection thread completes the final phase of the garbage collection process. Therefore, at time $T_{12}$, both the first and second garbage collection threads are complete and the application threads 1-N may be restarted.

A small pause exists between the completion time of the last thread of the present phase $T_{11}$ and when the next application thread can be restarted at time $T_{12}$. Again, this time period represents the overhead in ensuring that all the threads have completed before restarting the application thread.

In order to reduce the relative wait times (e.g., the time $T_1$ to $T_2$ during the marking phase shown in FIG. 5) for the processing units, the memory managers 48 attempt to balance the heaps. Balancing the heaps generally relates to allocating relatively even amounts of memory objects to the different heaps. One method of balancing heaps involves allocating new threads to the processing unit maintaining the heap having the smallest amount of allocated memory space. This process may work especially well in a server system designed to handle large numbers of requests, wherein each new request is a new thread and wherein all threads have similar memory requirements. Many other balancing algorithms may be employed in other embodiments.

The above described system and method provides the ability to use all the processors in a multiprocessor system to perform garbage collection which may significantly reduce the garbage collection process time. Using all the processors may require that each processor perform a few extra instructions to maintain a relatively synchronized garbage collection process but the added instructions are relatively minor compared to the overall increase in speed by having all processors operating during this time. Additionally, the above system is highly scalable since more processing units may be added without significantly changing the garbage collection process. That is, the number of processing units in the system does not limit the process outlined above.

Although the invention has been described in language specific to structural features, methodological acts, and computer readable media containing such acts, it is to be understood that the invention defined in the appended claims is not necessarily limited to the specific structure, acts or media described. As an example, other garbage collection techniques that use marking can benefit from the principles of the present invention. Therefore, the specific structure, acts or media are disclosed as preferred forms of implementing the claimed invention.

What is claimed is:

1. A method of collecting garbage in a computer system having a shared memory and two or more processors that share the shared memory, the method comprising:

logically dividing the memory into two or more heaps;

dedicating each heap to one of the two or more processors for garbage collection, wherein each heap is sharable among the two or more processors for interfering processes and threads, and wherein a memory object in a heap dedicated to one of the two or more processors references an object in a heap dedicated to another of the two or more processors;

initiating concurrently by each of the two or more processors one of a plurality of garbage collection phases, wherein each processor having a dedicated heap performs the one of the plurality of garbage collection phases on the heap dedicated to that processor substantially concurrently with another processor having a dedicated heap performing the one of the plurality of phases on the heap dedicated to that another processor, and wherein the plurality of garbage collection phases comprises:

a marking phase that marks all reachable objects in the shared memory;

a planning phase that maps a relocation of the reachable objects in each heap, the planning phase creating a directory indicating new address location information;

a relocation phase that updates object reference information for each heap with a new address location based on information calculated by the planning phase; and a compaction phase that compacts the reachable objects in each heap;

when a memory object in a heap dedicated to one of the two or more processors references an object in a heap dedicated to another of the two or more processors, allowing the one processor to perform the one of the plurality of garbage collection phases on the referenced object in the heap dedicated to the another processor at the same time the another processor is performing the one of the plurality of garbage collection phases on the referenced object in the heap dedicated to the another processor; and upon completion of the one of the plurality of garbage collection phases by each of the two or more processors, synchronizing the two or more processors prior to each processor beginning a next phase.

2. The method as defined in claim 1 wherein the synchronizing act comprises:

for each processor performing a phase of the plurality of garbage collection phases, upon completion of the phase of the plurality of garbage collection phases, waiting for other processors to complete the phase of the plurality of garbage collection phases; and once the other processors have completed the phase of the plurality of garbage collection phases, beginning the next phase of the plurality of garbage collection phases.

3. The method as defined in claim 1, wherein the planning phase maintains a directory of object references and wherein the relocation phase further comprises:

analyzing each memory object to retrieve references to other memory objects;

if a reference to another object is present, analyzing the reference information for the referenced object in the memory object to determine with which heap the referenced object is associated;

analyzing the directory of the associated heap for the referenced object to determine a new address location of the referenced object; and updating the reference information in the memory object with the new address location of the referenced object.

4. A computer program product readable by a computer and encoding instructions for executing a computer process for collecting garbage in a computer system having a memory and two or more processors that share the memory, the process comprising:

logically dividing the memory into two or more heaps;

dedicating each heap to one of the two or more processors for garbage collection, wherein each heap is sharable among the two or more processors for interfering processes and threads, and wherein a memory object in a heap dedicated to one of the two or more processors references an object in a heap dedicated to another of the two or more processors;

initiating concurrently by each of the two or more processors one of a plurality of garbage collection phases, wherein each processor having a dedicated heap performs the one of the plurality of garbage collection phases on the heap dedicated to that processor substantially concurrently with another processor having a dedicated heap performing the one of the plurality of phases on the heap dedicated to that another processor, and wherein the plurality of garbage collection phases comprises:

a marking phase that marks all reachable objects in the shared memory;

a planning phase that maps a relocation of the reachable objects in each heap, the planning phase creating a directory indicating new address location information;

a relocation phase that updates object reference information in each heap with a new address location based on information calculated by the planning phase; and a compaction phase that compacts the reachable objects in each heap;

when a memory object in a heap dedicated to one of the two or more processors references an object in a heap dedicated to another of the two or more processors, allowing the one processor to perform the one of the plurality of garbage collection phases on the referenced object in the heap dedicated to the another processor at the same time the another processor is performing the one of the plurality of garbage collection phases on the referenced object in the heap dedicated to the another processor; and upon completion of the one of the plurality of garbage collection phases by each of the two or more processors, synchronizing the two or more processors prior to beginning a next phase.

5. The computer program product as defined in claim 4 wherein the synchronizing act comprises:

for each processor performing a phase of the plurality of garbage collection phases, upon completion of the phase of the plurality of garbage collection phases, waiting for other processors to complete the phase of the plurality of garbage collection phases; and once the other processors have completed the phase of the plurality of garbage collection phases, beginning the next phase of the plurality of garbage collection phases.

6. The computer program product as defined in claim 4, wherein the planning phase maintains a directory of object references and wherein the relocation phase further comprises:

analyzing each memory object to retrieve references to other memory objects;

analyzing reference information for a referenced object in the memory object to determine with which heap the referenced object is associated;

analyzing the directory of the associated heap for the referenced object to determine a new address location of the referenced object; and updating the reference information in the memory object with the new address location of the referenced object.

7. A computer system, comprising:

two or more processing units;

a shared memory, the shared memory divided into two or more heaps wherein each heap is dedicated to one processing unit for garbage collection, the shared memory being sharable among the two or more processing units for interfering processes and threads, and wherein a memory object in a heap dedicated to one of the two or more processing units references an object in a heap dedicated to another of the two or more processing units;

a computer storage medium having computer executable modules for execution in a runtime environment, the modules comprising:

two or more garbage collection modules for reclaiming unused memory objects located within the shared memory, each garbage collection module associated with a respective one of the processing units and configured to perform a plurality of garbage collection activities, wherein each garbage collection module operates on a respective one of the dedicated heaps of memory, and wherein when a memory object in one of the dedicated heaps of memory references an object in another of the dedicated heaps of memory, allowing the garbage collection module operating on the respective one of the dedicated heaps of memory to perform one of the plurality of garbage collection activities on the referenced object in the another of the dedicated heaps of memory at the same time the another processing unit is performing the one of the plurality of garbage collection activities on the referenced object in the another of the dedicated heaps of memory; and a synchronizing module for synchronizing the plurality of garbage collection activities, wherein the plurality of garbage collection activities comprise a marking phase, a planning phase, a relocation phase, and a compaction phase, and wherein each phase of the plurality of garbage collection activities is performed substantially concurrently by each of the two or more garbage collection modules, and wherein the two or more garbage collection modules are synchronized after each phase of the plurality of garbage collection activities.

8. The method as defined in claim 1, further comprising, pausing the interfering processes and threads prior to performing the plurality of garbage collection phases.

9. The method as defined in claim 8, further comprising, determining that all processors have completed each of the plurality of garbage collection phases and restarting the paused interfering processes and threads.

10. The computer program product as defined in claim 4, further comprising, pausing the interfering processes and threads prior to performing the plurality of garbage collection phases.

11. The computer program product as defined in claim 10, further comprising, determining that all processors have completed each of the plurality of garbage collection phases and restarting the paused interfering processes and threads.

12. The computer system of claim 7, wherein the synchronization module pauses the interfering processes and threads prior to synchronizing the plurality of garbage collection activities performed by the garbage collection modules.

13. The computer system of claim 12, wherein the synchronization module restarts the interfering processes and threads after synchronizing the plurality of garbage collection activities performed by the garbage collection modules.

14. The computer system of claim 7, wherein the synchronizing module synchronizes marking activities of the plurality of garbage collection activities performed by the garbage collection modules.

15. The computer system of claim 7, wherein the synchronizing module synchronizes planning activities of the plurality of garbage collection activities performed by the garbage collection modules.

16. The computer system of claim 7, wherein the synchronizing module synchronizes relocation activities of the plurality of garbage collection activities performed by the garbage collection modules.

* * * * *